(12) United States Patent
Wardle

(10) Patent No.: US 7,273,980 B2
(45) Date of Patent: Sep. 25, 2007

(54) POSITION AND VELOCITY TRANSDUCER USING A PHONOGRAPH DISC AND TURNTABLE

(76) Inventor: Scott A. Wardle, 823 Riverside Ave., Santa Cruz, CA (US) 95060

( * ) Notice: Subject to any disclaimer, the term of this patent is extended or adjusted under 35 U.S.C. 154(b) by 299 days.

(21) Appl. No.: 11/033,797

(22) Filed: Jan. 12, 2005

(65) Prior Publication Data

US 2005/0152236 A1 Jul. 14, 2005

Related U.S. Application Data

(60) Provisional application No. 60/536,047, filed on Jan. 13, 2004.

(51) Int. Cl.
*G10H 7/00* (2006.01)

(52) U.S. Cl. ........................................ 84/645

(58) Field of Classification Search ............. 369/39.01, 369/4; 84/626, 612, 723, 645; 250/231.13
See application file for complete search history.

(56) References Cited

U.S. PATENT DOCUMENTS

| 4,198,658 | A * | 4/1980 | Palmer | 386/116 |
| 6,881,949 | B2 * | 4/2005 | Spencer | 250/231.13 |
| 7,012,184 | B2 * | 3/2006 | Bastian | 84/612 |

* cited by examiner

*Primary Examiner*—Lincoln Donovan
*Assistant Examiner*—Andrew Millikin
(74) *Attorney, Agent, or Firm*—Burns & Levinson LLP; Stephen Y. Chow

(57) ABSTRACT

A system and method for capturing turntable expressions using generated high-powered and low-powered signals to transduce the absolute position and velocity information of forward and reverse movements of a turntable stylus.

22 Claims, 4 Drawing Sheets

Frequency content of the signal to be recorded on the vinyl record.

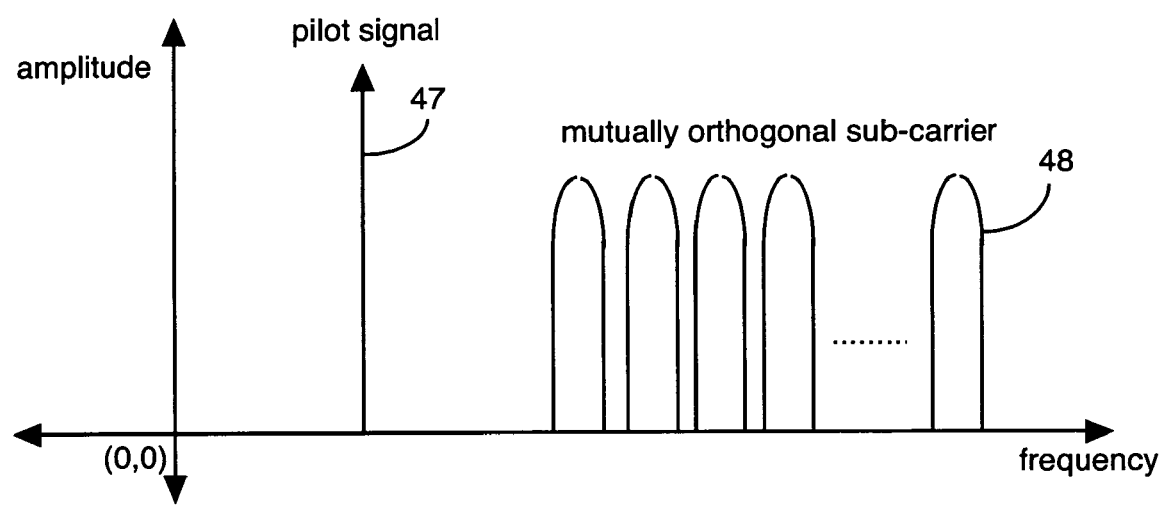
Figure 1. Frequency content of the signal to be recorded on the vinyl record.

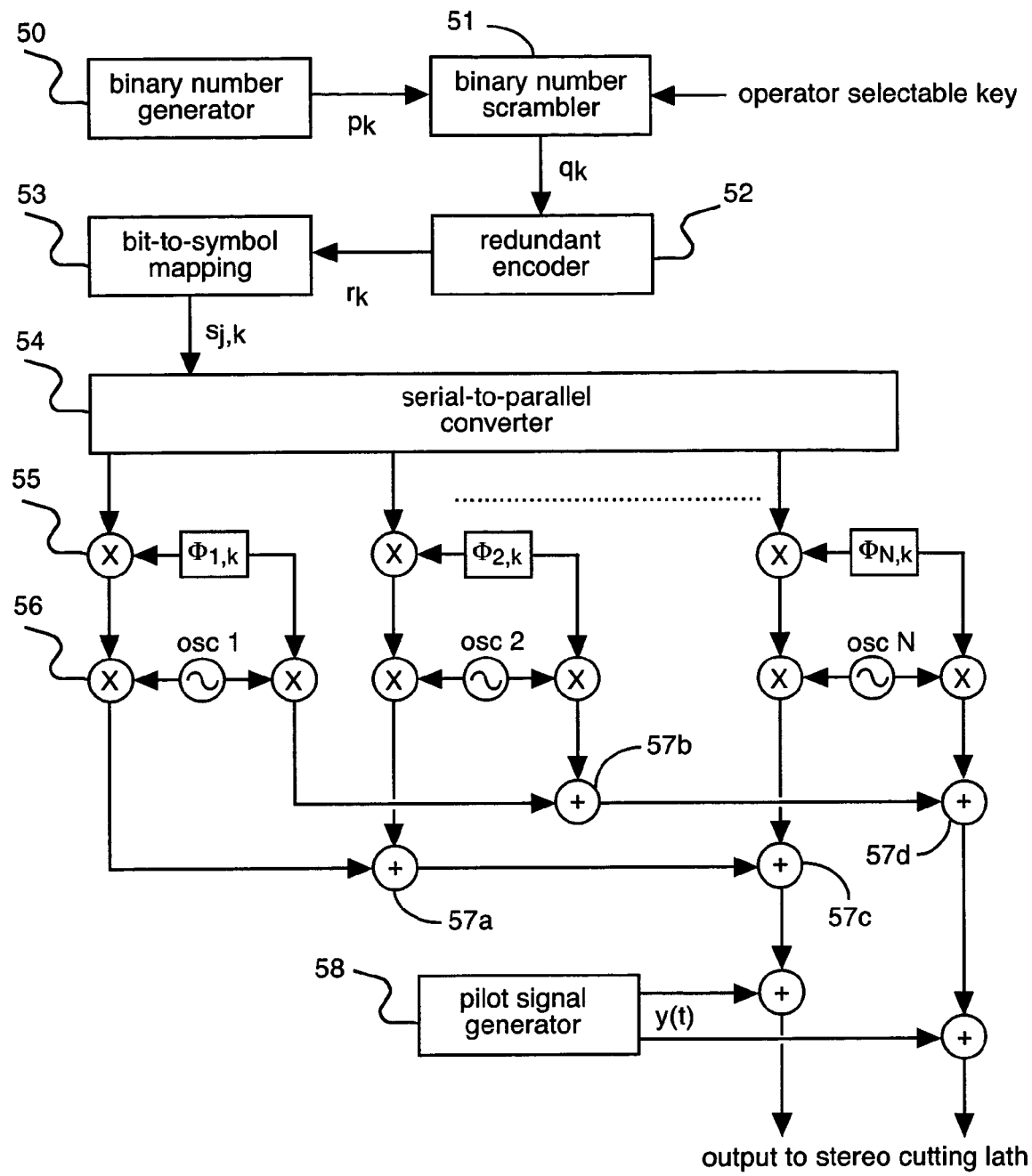
Figure 2. System for generating the signal to be recorded on the vinyl record.

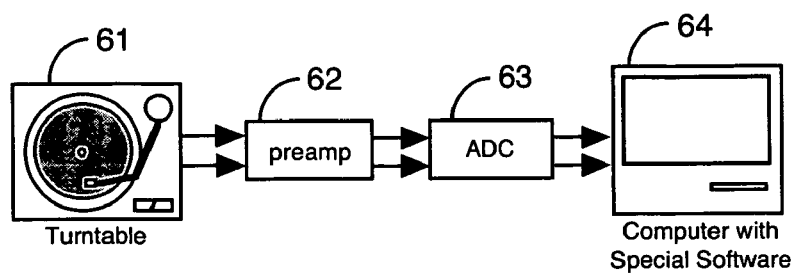
Figure 3. Simplest embodiment of the system for transducing velocity and position information according to present invention.

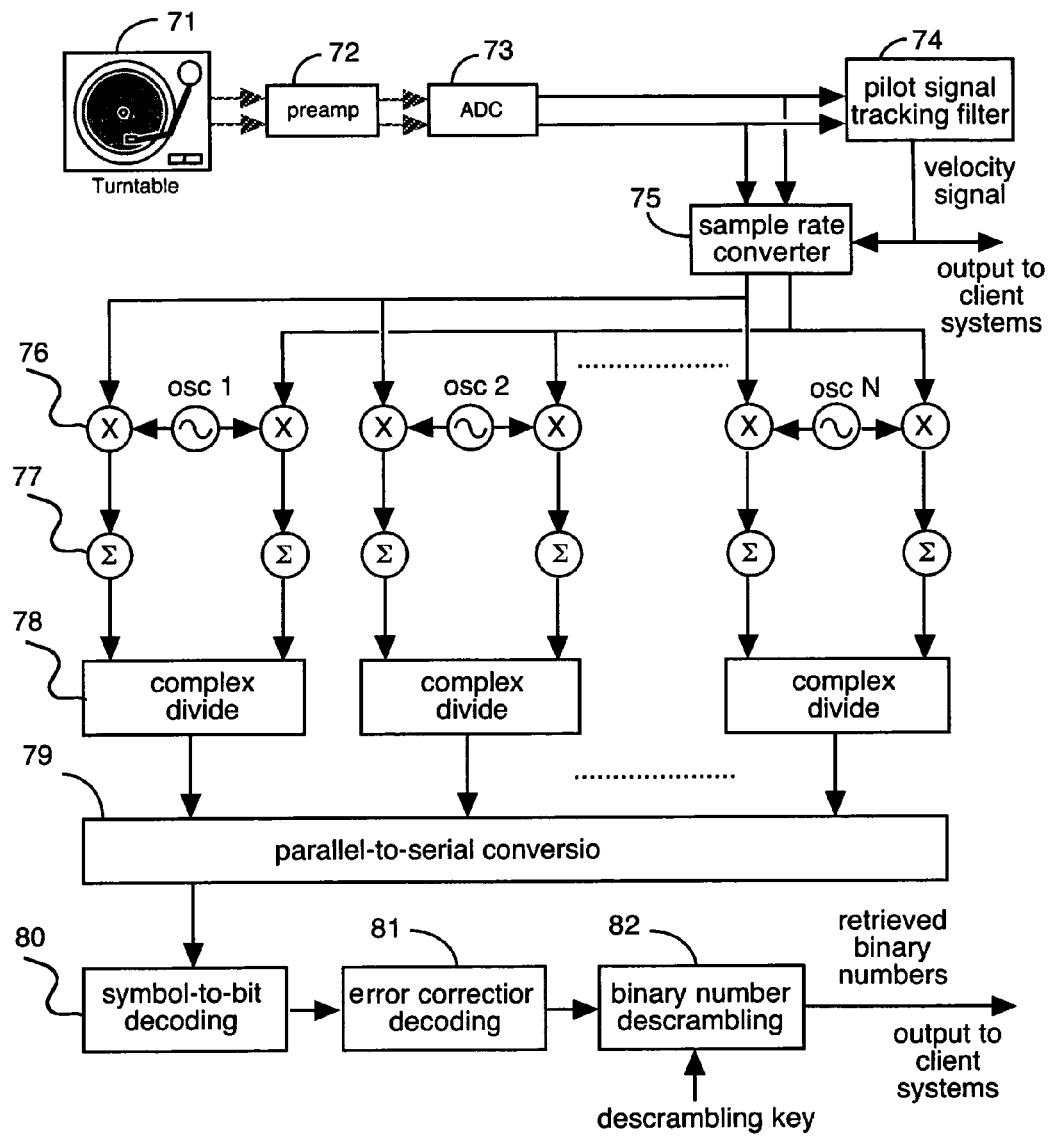
Figure 4. Processing system for recovering velocity and position information from samples.

POSITION AND VELOCITY TRANSDUCER USING A PHONOGRAPH DISC AND TURNTABLE

CROSS REFERENCE TO RELATED APPLICATIONS

This application relates to and claims priority benefit under 35 U.S.C. § 119(e) to U.S. Provisional Patent Application Ser. No. 60/536,047, entitled "Position and Velocity Transducer using a Phonograph Disc and Turntable", filed Jan. 13, 2004, which is hereby incorporated by reference in its entirety.

FIELD OF THE INVENTION

This invention relates in general to transducers which convert physical movement into data for use in digital computer systems, and in particular to transducers used to capture the expressions of turntable scratching.

BACKGROUND OF THE INVENTION

In many genres of contemporary popular music (e.g. hip-hop, rap, techno, etc.), and in spite of the advent of digital audio media such as the compact disc and the MP3 computer audio file, the analog phonograph turntable still plays an integral role. In its simplest application, the turntable is used by a Disc Jockey (DJ) to play back, without manipulation, previously recorded phonograph records. A phonograph record is typically in the format of a vinyl record or is made from similar material. The record generally has the appearance of a twelve inch, 33⅓ rpm vinyl record with a spiral grove. In this scenario, the DJ simply places each successive phonograph record onto the turntable and initiates playback of the record by engaging the drive motor of the turntable and placing the stylus onto the record at the beginning of its groove trajectory.

This procedure is well known to anyone who has ever played a phonograph record. In more advanced applications, the DJ actually plays the turntable as a musical instrument. In this case, the DJ is not simply allowing the drive motor of the turntable to turn the phonograph record while the stylus traces through the groove trajectory of each selection on the record. Instead, the DJ manipulates the phonograph record itself, and various parts of the turntable mechanism, in order to dynamically change the rate at which the stylus passes through the groove trajectory of the record, the direction of the stylus' motion in the groove, and the position of the stylus within the groove trajectory. The development of subtle gestural techniques involving the analog phonograph turntable mechanism, often referred to as "scratching", has given rise to a new musical art form: turntablism.

The system presented herein provides an accurate and robust means of transducing turntable "scratch" gestures into digital form. Once captured in digital form, the scratch gestures can be applied by client systems in almost limitless ways.

Several devices exist which allow a turntablist to control digital audio sources using a grooved vinyl record and a conventional DJ turntable equipped with standard tonearm and stylus. See US Patent Application Publication US 2002/0181378 by Bastian and U.S. Pat. No. 6,818,815, issued to Cohen. The grooved vinyl record which is used with these devices typically contains an audio recording of a "timecode signal", or a "MIDI audio time code signal". Timecode signals of different flavors have been widely used for many years in the film and broadcast industries, usually to synchronize motion picture film or video with an accompanying soundtrack recorded on another medium such as magnetic tape. However, the demodulation and decoding of these timecode signals is problematic under the conditions of turntable scratching, and devices based on the prior art have suffered from a lack of robustness and dependability.

For example, the modulation technique described in US 2002/0181378 and used by existing devices to encode "time code" onto vinyl, produces a signal which is modulated onto a single carrier frequency within the audio spectrum. Due to the quantity of information it carries, this single modulated "time code" signal is relatively wide in frequency width compared to the usable frequency spectrum of the vinyl record medium. This signal is therefore very vulnerable to noise degradation and distortions which are inherent in the vinyl record medium, especially when the vinyl discs on which this signal is recorded are subjected to a turntablist's repeated "scratching" of the disc.

Furthermore, the modulation techniques used by devices based on prior art to encode "time code" onto vinyl produce a sequence of modulated symbols which is causal with respect to the forward direction of turntable motion, hence demodulation of the "time code" values is generally not possible when the record is spinning in reverse. This detracts significantly from the usefulness of existing devices for turntablists seeking to capture the subtlest nuances of their performance. Finally, the existing devices do not allow the use of the vinyl phonograph record and turntable as a generalized velocity and position transducer for digital applications. They only allow the user to manipulate the playback of digital audio sources, and hence severely restrict the ultimate creative applications.

Several objects and advantages of the system presented herein are the following:

(a) To provide a system for accurately transducing velocity and position information into digital form for arbitrary and flexible use in digital systems, where said velocity and position information is transduced from a standard DJ analog phonograph turntable mechanism playing a special grooved vinyl record.

(b) To provide the system described in (a) such that accurate transduction of velocity and position information is maintained even under conditions of degraded signal quality resulting from heavy use of the special vinyl record.

(c) To provide the system described in (a) and (b) such that both velocity and absolute position information are equally recoverable whether the record is spinning in the normal forward direction of playback, or in the reverse direction.

(d) To provide the system described in (a)-(c) such that computational cost is kept low.

(e) To provide the system described in (a)-(d) such that no additional hardware beyond that which is commonly available to the DJ is required, excepting a modern digital computer equipped with stereophonic analog-to-digital converters. This keeps overall system cost to a minimum, and allows the user to freely configure their system to meet their own cost vs. quality requirements.

SUMMARY OF THE INVENTION

In accordance with a first aspect of the system presented herein, a special signal is generated and recorded onto a stereophonic grooved phonograph record, which recording is made according to standard procedures of the recording industry. As a second aspect of the system, the record containing this special signal is played on a standard DJ phonograph turntable equipped with tonearm and stylus connected to a digital computer running special software and equipped with one or more stereophonic analog-to-digital converters. The special software processes the digital samples taken as the record plays on the turntable in order to transduce with high accuracy and robustness in the presence of the noise and distortion both velocity and absolute position information from the motion of the stylus within the groove trajectory of the record. The velocity and position information produced is made available to client systems in the digital domain for arbitrary and flexible use.

The first and second aspects of the system comprise a signal generator module for the creation and recording of at least one high-powered pilot signal and a plurality of lower-powered carrier signals, a turntable having a moveable tonearm, a stereophonic pickup cartridge and a stylus, a stereophonic grooved phonograph record moveably attached to the turntable and containing the recorded signals, a preamplifier connected to the turntable, at least one stereophonic analog-to-digital converter, wherein an input of said analog-to-digital converter is connected to an output of the preamplifier and wherein an output of the analog to digital converter is connected to the digital computer, and a digital computer capable of running software and connected to the at least one stereophonic analog-to-digital converter.

The method of applying the first and second aspects of the system comprises generating a signal comprising at least one high-powered pilot signal of a single frequency and a plurality of lower-powered carrier signals, recording the generated signal onto a stereophonic grooved phonograph record, initiating operation of software stored onto a digital computer, inserting the stylus into a segmented groove trajectory of the stereophonic grooved record, applying scratching techniques in a forward and reverse direction to the stereophonic grooved phonograph record and the turntable, extracting velocity and absolute position information of said stylus in each direction, transducing the velocity and absolute position information of said stylus into digital information, and applying the transduced velocity and absolute position information to client systems at a rate suitable to capture the nuances of the movements of the stylus in the forward and reverse directions.

BRIEF DESCRIPTION OF THE DRAWINGS

FIG. 1: Shows a frequency domain plot of an example of a special signal generated according to the present system.

FIG. 2: Shows a block diagram of the system for generating the special signal to be recorded onto a stereophonic grooved vinyl record.

FIG. 3: Shows a simplest embodiment of the present system for transducing velocity and absolute position information from the special record played on a standard DJ phonograph turntable.

FIG. 4: Shows a block diagram of the system according to the present system for extracting the velocity and absolute position information from the motions of the special record on a standard DJ phonograph turntable.

DESCRIPTION OF THE PREFERRED EMBODIMENT

In a first aspect of the system presented herein, a special signal is generated and recorded onto a stereophonic grooved vinyl phonograph record. This special signal consists of two basic components, as depicted in FIG. 1. First, it contains a high-powered pilot signal of a single frequency within the audio range 47. Second, it contains a plurality of lower-powered carrier signals 48 each of which:

(a) is within the audio range,
(b) is modulated by a stream of digital information, where said digital information consists of a set of redundantly encoded and possibly scrambled binary values each of which corresponds to a certain prescribed segment of the total groove trajectory of the vinyl record,
(c) is substantially mutually orthogonal both to the other carrier signals and to the pilot signal, and
(d) carries only a fraction of the total digital information stream to be recorded.

A system for producing the special signal of FIG. 1 is shown in FIG. 2. A binary number generator 50 produces a non-repeating sequence $$p_k, 0 \leq k \leq 2^M - 1$$

of M-bit binary values each of which is assigned to correspond to one segment of the groove trajectory of a vinyl record.

In practice, the length of the segments to which the numbers $p_k$ are assigned should be made such that for each complete rotation of the record there are at least 100 discrete segments. This works out to having M be equal to about 16 or 17 bits. The numbers $p_k$ need not be in normal counting order. The numbers $p_k$ are fed into a binary number scrambler 51 which produces a new non-repeating sequence $q_k$ of M-bit binary numbers such that each element of $p_k$ corresponds to one and only one element of $q_k$. The mapping of values $p_k$ to $q_k$ can be selected by the system operator from among a set of predetermined scrambling keys. The selectable mappings of $p_k$ to $q_k$ also of course include the identity mapping which makes $p_k$ identically equal to $q_k$, for all values of k, essentially disabling or bypassing the binary number scrambler. A redundant encoder 52 then produces a new non-repeating sequence $$r_k, 0 \leq k \leq 2^M - 1$$

of L-bit binary values, where L>M. A bit-to-symbol mapping 53 is used to change each L-bit value in the sequence $r_k$ into a unique sequence $s_{j,k}$ of N digital symbols according to methods familiar to persons skilled in the art of digital telecommunications. Each of the N digital symbols can be expressed as a complex number having a modulus $A_{j,k}$ and angle $\theta_{j,k}$ $$s_{j,k} = A_{j,k} e^{i\theta_{j,k}}, 0 \leq j \leq N-1, 0 \leq k \leq 2^M - 1$$

A serial-to-parallel converter 54 converts each sequence $s_{j,k}$ of N digital symbols into N parallel streams of digital symbols which are multiplied by a bank of N complex numbers $\Phi_{j,k}$ 55. The products of $s_{j,k}$ and $\Phi_{j,k}$ are applied individually to a bank of N carrier signal oscillators 56 for output on one stereo channel. The complex values $\Phi_{j,k}$ are also used alone to modulate the same carriers 56 for output on the opposite stereo channel. The complex values $\Phi_{j,k}$ should be selected so as to all have substantially the same magnitude, but different angles selected according to a heuristic or some selection procedure which will optimally minimize or heuristically attempt to minimize the maximum magnitude of any peaks in the final output signal resulting from periodic mutual reinforcement of the superposition of the N modulated carrier signals and the pilot signal. The outputs of the N modulated carriers are summed together with the output of a pilot signal generator 58 to produce the final signal output to the record cutting lathe.

In the preferred embodiment, the N carrier signal 56 oscillators and the addition operators that immediately follow their output 57*a-d* can be implemented using an Inverse Fast Fourier Transform (IFFT), or other similar orthogonal transform. The pilot signal generator 58 produces the real and imaginary parts of a rotating complex phasor signal of angular frequency $\omega_p$ $$y(t)=Pe^{i\omega_p t}$$

A key property of the special signal generated by this system is the fact that for each discrete segment of the total groove trajectory of the vinyl record, the encoding procedure produces N digital symbols. This number N is also the number of sub-carriers contained in the signal. Therefore, all N symbols comprising the total encoded binary value corresponding to each segment of the vinyl record's groove trajectory are recorded simultaneously in time when the special signal is applied to the input of the record cutting lathe. Likewise, when the disc is played back, all N symbols comprising the total encoded binary value corresponding to each segment of the vinyl record's groove trajectory are recovered simultaneously in time, independently of whether the playback is in the normal forward direction, or in the reverse direction. This enables the position and velocity information to be recovered with equal ease whether the record is spinning forward or in reverse.

Another key property of the special signal generated by the system of FIG. 2 is the mutual orthogonality of all the components of the signal: the pilot signal is orthogonal to all the sub-carriers, which are also substantially mutually orthogonal. This orthogonality, as well as the high-powered nature of the pilot signal, ensures that the pilot signal's frequency and phase can be accurately tracked even in the presence of noise and distortion.

A second aspect of the system, a phonograph turntable velocity and position transducer using the special vinyl record produced by the system shown in FIG. 2, is shown in FIG. 3. The record containing the special signal produced by the system of FIG. 2 is played on a standard DJ phonograph turntable 61 connected to a preamplifier 62, which is in turn connected to a digital computer 64 running special software and equipped with a stereophonic analog-to-digital converter (ADC) 63 The special software processes the signal from the record in order to transduce with high accuracy and robustness in the presence of noise both velocity and absolute position information from the motion of the stylus within the groove trajectory of the record as it plays on the turntable.

A system for recovering the velocity and position information from samples supplied to the digital computer by the stereophonic analog-to-digital converter shown in FIG. 3 is shown in FIG. 4.

As in FIG. 3, a phonograph turntable 71 is connected to preamplifier 72, which is in turn connected to a stereophonic analog-to-digital converter 73. A digital filter 74 is used to track the frequency and phase of the pilot signal. Because the pilot signal is powerful compared to the N smaller subcarriers, and because of its orthogonality to the other signal components, its frequency and phase can be accurately tracked using techniques familiar to persons skilled in the art of digital telecommunications. For example, it is advantageous to use techniques based on the Fast Fourier Transform (FFT), or a similar orthogonal transform, for estimating and tracking the pilot signal's frequency and phase. The output of the pilot signal tracking filter is provided for arbitrary use as an input signal to other systems, and is also used to drive a sample rate converter 75. This sample rate converter effectively tunes the N subcarriers simultaneously back to their original center frequencies. A bank of N oscillators 76 followed by N integrators 77 followed by N complex divide operators 78 is used to perform demodulation of the N subcarriers.

In the preferred embodiment, the bank of N oscillators 76 followed by the N integrators 77 is implemented using the Fast Fourier Transform (FFT), or a similar orthogonal transform. The demodulated digital symbols are fed into a parallel-to-serial converter 79 which turns each group of N digital symbols presented on its inputs at a single instant in time into an ordered serial sequence of N symbols. A symbol-to-bit decoder 80 transforms the ordered serial sequence of N symbols into an L-bit binary value $r'_k$ which is passed through an error correcting decoder 81 to produce an estimate of the M-bit binary number $q'_k$. A binary number descrambler 82 maps each $q'_k$ to an estimate of the original binary number $p'_k$ which corresponds to a known particular segment of the groove trajectory of the special vinyl record. The binary number descrambler operates according to the descrambling key provided to it. If the proper descrambling key is not provided, the recovered binary values $p'_k$ will be scrambled relative to their original intended order. The recovered binary values are made available to client systems in digital form for arbitrary and flexible use.

During operation of the first aspect of the system presented herein, the signal generation system shown in FIG. 2 is connected to the input of a record cutting lathe, or allowed to have its output recorded to a high fidelity stereophonic audio recording medium (e.g. compact disc) suitable for subsequent input to a record cutting lathe. The system of FIG. 2 is then engaged by an operator who enters a scrambling key and initiates the operation of the binary number generator.

In the operation of the second aspect of the system, a turntablist/DJ places the special vinyl record produced by the signal generation system described herein onto the turntable platter of a conventional DJ phonograph record player equipped with a tonearm and a standard stereophonic pickup cartridge and stylus. As shown in FIG. 3, the output from the phonograph record player is connected to a preamplifier which is in turn connected to a stereophonic analog-to-digital converter, which finally is connected to a computer running the special software described above. The turntablist/DJ initiates operation of the software running on the computer and then proceeds to play the special phonograph record by lowering the pickup element into the groove of the special record and operating just as she would normally using a standard phonograph record on which music is recorded.

This operation includes, of course, "scratching" manipulations of the record. The turntablist also initiates operation of any client systems to which the transduced velocity and position measurements are provided as inputs. During the steady-state operation of the system, highly accurate position and velocity measurements reflecting the current position and velocity of the phonograph stylus within the groove trajectory of the special vinyl record are supplied to client systems. The rate at which these measurements are supplied should be high enough so as to accurately capture all the subtle nuances of a turntablist's scratching performance.

Having thus described a presently preferred embodiment of the present system, it will be understood by those skilled in the art that many changes and widely differing embodiments and applications of the system will suggest them- selves without departing from the scope of the present system as defined in the claims. The disclosures and the description herein are intended to be illustrative and are not in any sense limiting of the system, defined in scope by the following claims.

I claim:

1. A system for digitally capturing turntable techniques, the system comprising:
   a. a signal generator module for the creation and recording of at least one high-powered pilot signal and a plurality of lower-powered carrier signals;
   b. a turntable having a moveable tonearm, a stereophonic pickup cartridge and a stylus;
   c. a stereophonic grooved phonograph record moveably attached to the turntable and containing the recorded signals;
   d. a preamplifier connected to the turntable;
   e. at least one stereophonic analog-to-digital converter, wherein an input of said analog-to-digital converter is connected to an output of the preamplifier and wherein an output of the analog to digital converter is connected to the digital computer; and
   f. a digital computer capable of running software and connected to the at least one stereophonic analog-to-digital converter.

2. The system of claim 1, wherein the signal generator module comprises a binary number generator, a binary number scrambler, a redundant encoder, a bit-to-symbol mapping module, a serial-to-parallel converter, and a bank of oscillators.

3. The system of claim 1, wherein the signal generator module contains a binary number scrambler which may be bypassed or disabled.

4. The system of claim 1, wherein the signal generator module further comprises a pilot signal generator, the output of which is summed together with the output of a bank of oscillators.

5. The system of claim 1, wherein the signal generator is connected to the input of a record cutting lathe or a high fidelity stereophonic audio recording medium suitable for subsequent input to a record cutting lathe.

6. The system of claim 1, wherein the stereophonic grooved phonographic record is vinyl.

7. The system of claim 1, wherein the turntable is a standard DJ phonograph turntable.

8. The system of claim 1, wherein the high-powered pilot signal has a single frequency.

9. The system of claim 1, wherein each of the lower-powered carrier signals is substantially and mutually orthogonal both to the other carrier signals and to the high-powered pilot signal.

10. The system of claim 1, wherein a complete rotation of the record in a forward or reverse direction contains at least 100 discrete segments within the segmented groove trajectory.

11. The system of claim 1, wherein an encoding procedure produces N symbols for each discrete segment of the segmented groove trajectory of the phonograph record, and wherein N is the number of a plurality of lower-powered carrier signals contained in the generated signal.

12. The system of claim 1, wherein a plurality of symbols comprising an encoded value corresponding to each discrete segment of the segmented groove trajectory of the phonograph record are recorded simultaneously in time.

13. The system of claim 1, wherein the velocity and absolute position of said stylus within the segmented groove trajectory of the phonograph record are equally recoverable in the forward and reverse directions of motion of said stylus within the groove trajectory of the phonograph record.

14. The system of claim 1, wherein a substantial and mutual orthogonality of the high-powered pilot signal and lower-powered carrier signals provides for maintenance of accurate transduction of said velocity and absolute position information under conditions of degraded signal quality.

15. A method for capturing turntable techniques, the method comprising:
   a. generating a signal comprising at least one high-powered pilot signal of a single frequency and a plurality of lower-powered carrier signals;
   b. recording the generated signal onto a stereophonic grooved phonograph record;
   c. initiating operation of software stored onto a digital computer;
   d. inserting a stylus into a segmented groove trajectory of the stereophonic grooved record;
   e. applying scratching techniques in a forward and reverse direction to the stereophonic grooved phonograph record and the turntable;
   f. extracting velocity and absolute position information of said stylus in each direction;
   g. transducing the velocity and absolute position information of said stylus into digital information; and
   h. applying the transduced velocity and absolute position information to client systems at a rate of at least 50 times per second.

16. The method of claim 15, wherein the velocity and absolute position of said stylus within the segmented groove trajectory of the phonograph record are equally recoverable in the forward and reverse directions of motion of said stylus within the groove trajectory of the phonograph record.

17. The method of claim 15, wherein a plurality of symbols comprising an encoded value corresponding to each discrete segment of the segmented groove trajectory of the phonograph record are recovered simultaneously in time independent of whether playback occurs in a forward or reverse direction.

18. The method of claim 15, wherein the stereophonic grooved phonograph record is scratched at a measurable rate.

19. The method of claim 15, wherein the transduced velocity information is applied to external digital systems at a rate of at least twice the measured rate of scratching.

20. The method of claim 15, wherein the transduced position information is applied to external client systems at a rate of at least 50 times per second.

21. The method of claim 15, wherein each of said plurality of lower-powered carrier signals is modulated by a stream of symbols derived from an encoding of a plurality of binary values, each binary value corresponding to a certain prescribed segment of the groove trajectory of the record.

22. The system of claim 1 wherein each of the lower-powered carrier signals is modulated by a stream of symbols derived from an encoding of a plurality of binary values, each binary value corresponding to a certain prescribed segment of the groove trajectory of the record.

* * * * *